United States Patent [19]
Shimada

[11] Patent Number: 5,526,339
[45] Date of Patent: Jun. 11, 1996

[54] DISK REPRODUCTION APPARATUS CAPABLE OF CONTINUOUSLY VARYING A REPRODUCTION SPEED

[75] Inventor: Hiroshi Shimada, Tokyo, Japan

[73] Assignee: Kabushiki Kaisha Toshiba, Kawasaki, Japan

[21] Appl. No.: 512,076

[22] Filed: Aug. 7, 1995

Related U.S. Application Data

[63] Continuation of Ser. No. 336,939, Nov. 10, 1994, abandoned.

[30] Foreign Application Priority Data

Nov. 11, 1993 [JP] Japan .................. 5-305861
Oct. 26, 1994 [JP] Japan .................. 6-262763

[51] Int. Cl.⁶ ........................................ G11B 7/00
[52] U.S. Cl. .................. 369/124; 369/116; 369/59; 360/10.2; 360/77.13
[58] Field of Search ........................ 369/124, 116, 369/106, 54, 55, 58, 59, 60; 360/10.2, 77.13, 77.16, 51

[56] References Cited

U.S. PATENT DOCUMENTS

| | | | |
|---|---|---|---|
| 3,845,500 | 10/1974 | Hart | 360/77.13 |
| 4,255,768 | 3/1981 | Kubota | 360/10.2 |
| 5,140,580 | 8/1992 | Ohara et al. | 369/116 |
| 5,345,434 | 9/1994 | Ide et al. | 369/124 |
| 5,353,270 | 10/1994 | Imura | 369/59 |
| 5,359,585 | 10/1994 | Tanoue et al. | 369/59 |
| 5,410,527 | 4/1995 | Ashinuma | 369/58 |
| 5,418,770 | 5/1995 | Ide et al. | 369/116 |

FOREIGN PATENT DOCUMENTS

| | | |
|---|---|---|
| 0077075 | 4/1983 | European Pat. Off. . |
| 0605222 | 7/1994 | European Pat. Off. . |

OTHER PUBLICATIONS

Patent Abstracts of Japan, vol. 12, No. 16 (P-656), Jan. 19, 1988, JP 62 172567, Jul. 29, 1987.

*Primary Examiner*—Loha Ben
*Attorney, Agent, or Firm*—Oblon, Spivak, McClelland, Maier & Neustadt

[57] ABSTRACT

A pickup reads data recorded on a disk and outputs a current signal corresponding to the read data. An amplifier outputs the current signal as a voltage signal. A data slice circuit binarizes the voltage signal and converts it into an EFM signal. In response to the EFM signal, a PLL circuit generates a PLL clock signal in synchronization with a reproduction speed. When a reference speed or its two-times higher speed is selected as the reproduction speed, if the PLL clock signal is synchronized with the EFM signal, the frequency of the PLL clock signal is proportionate to the reproduction speed. In response to the PLL clock signal, the data slice circuit controls the frequency band of a reference voltage in accordance with the reproduction speed, and outputs the EFM signal. A data processing circuit demodulates the EFM signal and removes a jitter from the demodulated signal in response to the PLL clock signal. The data processing circuit also corrects an error of data corresponding to the demodulated signal in response to the PLL clock signal, and outputs audio data.

25 Claims, 3 Drawing Sheets

DISK REPRODUCTION APPARATUS CAPABLE OF CONTINUOUSLY VARYING A REPRODUCTION SPEED

This application is a continuation of application Ser. No. 08/336,939, filed on Nov. 10, 1994, now abandoned.

BACKGROUND OF THE INVENTION

1. Field of the Invention

The present invention relates to an optical disk reproduction apparatus such as a CD (compact disk) and, more specifically, to a data slice circuit of a reproduction apparatus capable of continuously varying a reproduction speed.

2. Description of the Related Art

A digital recording/reproduction system is now under development in the field of sound equipment. In this system, in order to record/reproduce a signal with high density and high reliability, an audio signal is converted into a digital signal by the PCM (pulse code modulation) technique, and the digital signal is recorded on a disk, a magnetic tape, or the like and reproduced therefrom. At present, a CD 12 cm in diameter, on which a bit sequence corresponding to digital data is formed and from which the bit sequence is optically read out, is the most popular.

The CD mainly stores 16-bit PCM data (main data) of an analog audio signal. The digital data is stored in the CD by repeating one frame constituted of 24 symbols each having 8 bits. The CD employs a CIRC (cross interleave reed-solomon code) as an error correction code.

More specifically, the digital data of 24 symbols is supplied to a C2 encoder to generate a C2-sequence error correcting parity symbol Q of 4 symbols. Both the digital data and parity symbol Q are supplied to a C1 encoder via an interleave circuit to generate C1-sequence error correcting parity symbol P of 4 symbols. 32-symbol data constituted of 24-symbol digital data, 4-symbol parity symbol P and 4-symbol parity symbol Q receives subcode data of 8 bits (one symbol). The subcode data and 32-symbol data are modulated by EFM (eight to fourteen modulation). Then a margin bit of 3 extra bits is added between 14-bit symbols of the modulated data, and a 24-bit synchronization pattern is added to the head of the bit sequence. Thus, 588-bit data is recorded on the disk as one frame. Since, in this case, the channel bit frequency is 4.32 MHz, the data of one frame is recorded on the disk in 136 μsec (at a frequency of 7.35 KHz). One subcode block consists of 98 subcode frames, and data of one subcode frame is recorded on the disk at a frequency of 75 Hz (10.3 msec).

A disk reproduction apparatus for reproducing data from the CD mentioned above rotates the CD at a CLV (constant linear velocity) by a motor and a motor control circuit. An optical pickup device including a semiconductor laser, a photoelectric transducer, etc. reads data recorded on the CD by linearly tracking the disk from the inner circumference to the outer one. The read data (current signal) is supplied to an amplifier. The amplifier converts the current signal into a wideband signal (hereinafter referred to as RF signal) as a voltage signal and supplies it to a data slice circuit. The data slice circuit binarizes the RF signal and supplies it, as an EFM signal, to a PLL (phase locked loop) circuit and a data processing circuit. The data processing circuit separates a synchronization signal from the EFM signal and EFM-demodulates the remaining signal into data components of 32 symbols including parity symbols P and Q and subcode data components. The EFM-demodulated data is written to a memory of the data processing circuit in response to a clock signal generated from the PLL circuit. The data of the memory is read out in response to a quartz system reference clock signal generated using a quartz oscillator, and a jitter (variation of time axis) due to the motor is absorbed. The data read out from the memory, an error of which has been corrected, is output as 16-bit digital data.

The reproduction speed is varied by a system controller. The system controller generates a reproduction speed control signal (hereinafter referred to as HS signal). The HS signal designates, for example, a normal reproduction speed (referred to as equal speed) or a speed two times as high as the reference speed (referred to as two-times higher speed). The HS signal is supplied to the data processing circuit and motor control circuit in order to switch a processing speed or a disk reproduction speed to a desired speed. The data slice circuit receives the HS signal and varies a control frequency band in accordance with the reproduction speed.

Since the disk normally rotates at the CLV, its angular velocity is 500 rpm when the inner circumference of the disk is accessed, and it is 200 rpm when the outer circumference thereof is accessed. It is thus necessary to decrease the rotation speed of the motor to half or less when data on the inner circumference is reproduced after the outer circumference is searched. On the contrary, it is necessary to increase it twice or more when the inner circumference is searched after data on the outer circumference is reproduced.

A CD-ROM has lately attracted considerable attention as a digital recording/reproduction system. The CD-ROM mixedly stores audio signals and ROM data such as image information and character codes. When the audio signals are read out of the CD-ROM, the disk is rotated at an equal speed to reproduce data thereon. When the ROM data is read out, it is rotated at, e.g., a two-times higher speed in order to read it as fast as possible.

As described above, when data of the CD or CD-ROM is reproduced, the reproduction speed has to be switched frequently from the equal speed to the two-times higher speed or from the two-times higher speed to the equal speed. When the reproduction speed is switched, data cannot be reproduced stably before the rotation speed of the disk becomes constant, and the reproduction is thus intermitted. The intermittence of the reproduction due to the switching of the speed greatly reduces the performance of the reproduction apparatus. The performance can be improved by using a high-performance motor; however, in this case, the cost is greatly increased.

In the conventional disk reproduction apparatus described above, the reproduction speed does not vary continuously, but the two reproduction speeds of, e.g., the equal speed and two-times higher speed are switched discontinuously. The data slice circuit thus switches the control frequency band in accordance with the two reproduction speeds. More specifically, the conventional data slice circuit converts an input RF signal, which is compared with a reference voltage by a comparator, into binary data. An up-down counter counts a time period of binary data "0" and that of binary data "1" and outputs differential data indicative of a difference between the time periods.

The count clock of the up-down counter is a clock signal generated from the quartz system reference clock signal. The clock signal has a frequency which optimizes the control frequency band of the reference voltage of the data slice circuit. When the reproduction speed is an equal speed, the clock signal is supplied to the up-down counter. When the speed is a two-times higher speed, a clock signal whose frequency is twice as high as that of the clock signal is supplied to the up-down counter.

The differential data output from the up-down counter is sent to a digital-to-analog converter. The digital-to-analog converter converts the differential data into an analog voltage and feeds it back to the comparator as a reference voltage. The comparator binarizes the RF signal by the reference voltage such that a time period of data "0" and that of data "1" are equalized to each other.

The data slice circuit feeds back the result of count in such a manner that the time periods of data "1" and data "0" become equal to each other. If the frequency band of the feedback loop is too low, there is a flaw in the disk. If the amplitude of the RF signal is changed, the slice level cannot follow the amplitude. If the frequency band of the feedback loop is too high to the contrary, the slice level varies with the amplitude of the minute RF signal, and the jitter of the EFM signal increases after data is sliced. Therefore, the frequency division ratio of the clock signal has to be regulated such that the frequency band of the loop is optimized.

However, the control frequency band of the data slice circuit can be changed to only the two stages, as described above. For this reason, when the reproduction speed is varied continuously, the characteristics cannot be conformed with all the reproduction speeds and consequently the reproduction performance cannot be kept constant with respect to every reproduction speed.

SUMMARY OF THE INVENTION

An object of the present invention is to provide a disk reproduction apparatus capable of continuously varying a reproduction speed and reliably slicing data in accordance with the continuously variable reproduction speed.

The above object is attained by a disk reproduction apparatus which comprises:

read means for reading data recorded on a disk as an electrical signal;

a data slice circuit for binarizing the electrical signal supplied from the read means to generate an EFM signal;

a PLL circuit for generating a clock signal corresponding to a variation in reproduction speed of data, in response to the EFM signal supplied from the data slice circuit; and a data processing circuit for demodulating the EFM signal supplied from the data slice circuit in response to the clock signal supplied from the PLL circuit, and reproducing data, the data slice circuit including:

a comparator for comparing the electrical signal supplied from the photoelectric transducer with a reference voltage, the comparator outputting one of data "0" and data "1" in accordance with the electrical signal and the reference voltage;

a detecting means for detecting differential data representing a difference between the time period of the data "0" and the time period of the data "1" based on the clock signal supplied from the PLL circuit; and a voltage generating means supplied with the differential data from the detecting means, the voltage generating means for generating a voltage in response to the differential data and supplying the voltage to the comparator as the reference voltage.

According to the disk reproduction apparatus having the above constitution, the clock signal supplied from the PLL circuit is synchronized with the reproduction speed of data. The reproduction speed can be varied continuously by removing a jitter contained in data which is EFM-demodulated by using the clock signal. If, furthermore, the clock signal is used in the data slice circuit, the control frequency band of a reference voltage for slicing data can be varied continuously with the reproduction speed. Therefore, even when the reproduction speed is varied continuously, the data can reliably be sliced in accordance with the reproduction speed, and the reproduction performance can be prevented from being changed due to the reproduction speed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A disk reproduction apparatus according to an embodiment of the present invention will now be described.

Figure 1:
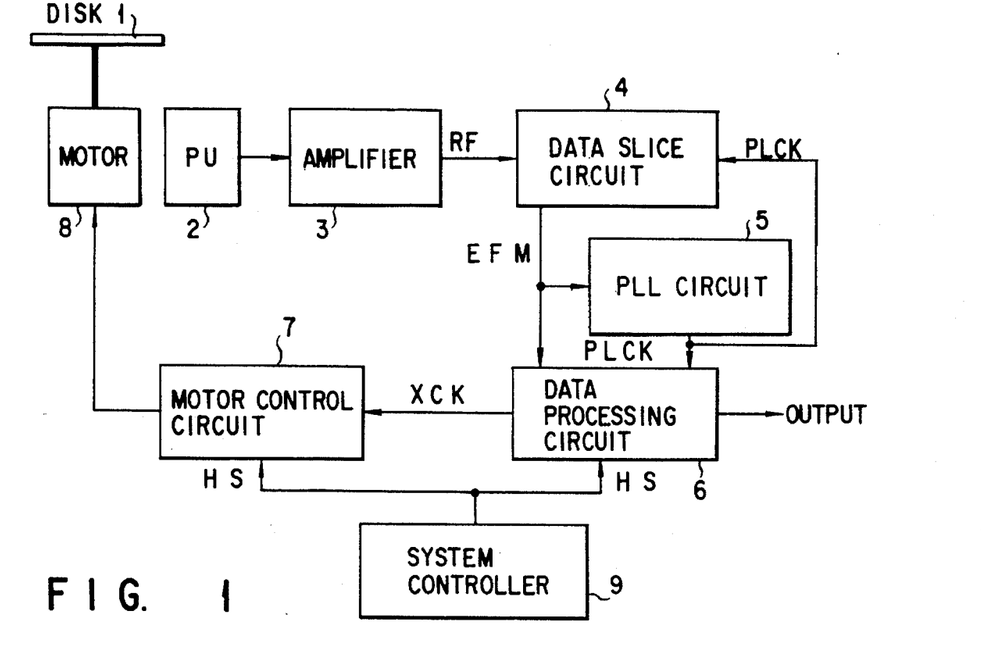
FIG. 1 is a block diagram showing a disk reproduction apparatus according to an embodiment of the present invention.

Referring to FIG. 1, a disk 1 is driven at a constant linear velocity (CLV) by means of a motor 8, and an optical pickup (PU) 2 including a semiconductor laser, a photoelectric transducer, etc. (not shown) reads data recorded on the disk 1. The PU 2 outputs data as a current signal and supplies it to a wide-band amplifier 3. The amplifier 3 amplifies the data and outputs an RF signal as a voltage signal. The RF signal is supplied to a data slice circuit 4. The data slice circuit 4 binarizes the RF signal and converts it into an EFM signal. The EFM signal is sent to a data processing circuit 6 and a PLL circuit 5.

The PLL circuit 5 generates a PLL clock signal (PLCK) in synchronization with the EFM signal. The center frequency (17.2872 MHz) of the PLCK is four times as high as the bit rate (4.3218 MHz) of the EFM signal. When the PLCK is synchronized with the RF signal, the frequency of the PLCK is proportionate to a reproduction speed. The PLCK is supplied to the data processing circuit, together with the EFM signal. The PLCK is also supplied to the data slice circuit 4, and the control frequency band of a reference voltage can thus be controlled in accordance with the reproduction speed.

The data processing circuit 6 executes EFM modulation, subcode modulation, error correction processing and the like, and an output signal thereof is supplied to a D/A converter (not shown). The output of the D/A converter is sent to a low-pass filter (not shown), and an audio signal is output from the low-pass filter. The data processing circuit 6 generates a system reference clock signal (XCK) using a quartz oscillator (not shown).

A motor control circuit 7 control the motor 8 in response to the XCK supplied from the data processing circuit 6 in order to keep the reproduction speed constant. The reproduction speed is varied by a reproduction speed control signal (HS signal) supplied from a system controller 9. More specifically, the system controller 9 sets the HS signal to an equal speed, a two-times higher speed, a four-times higher speed, etc. in accordance with the normal reproduction or fast-forward reproduction designated by an operator, or the reproduction position of the disk. The HS signal is supplied to the processing circuit 6 and motor control circuit 7, and these circuits change the processing speed and the rotation speed of the disk in response to the HS signal.

Figure 2:
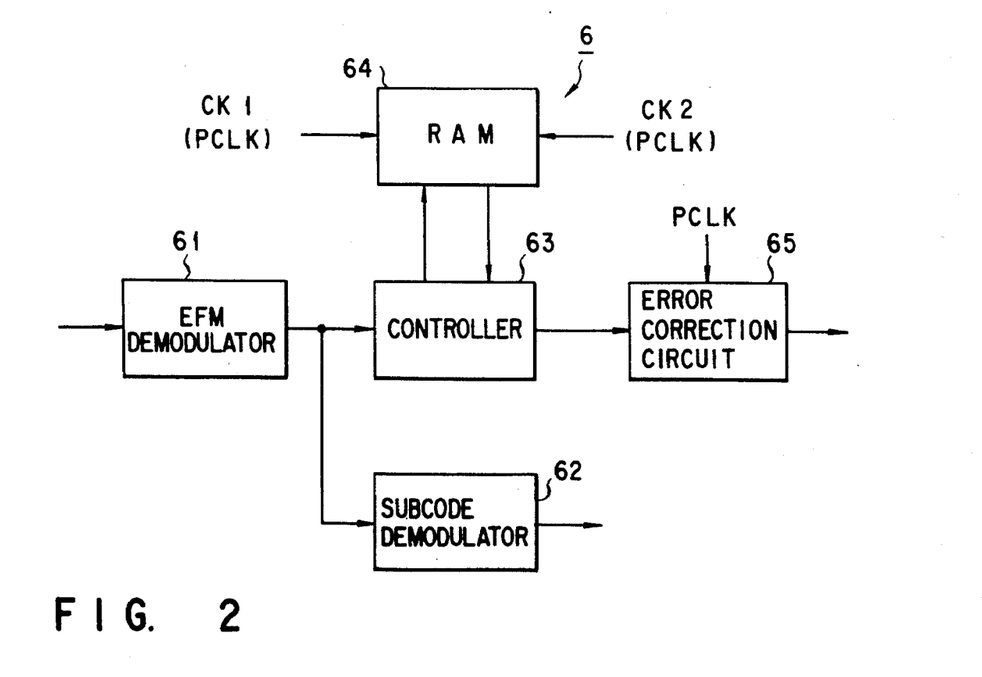
FIG. 2 is a block diagram schematically showing a data processing circuit of the disk reproduction apparatus of FIG. 1.

FIG. 2 schematically shows the data processing circuit 6. In this circuit, the EFM signal output from the data slice circuit 4 is supplied to an EFM demodulator 61 and demodulated therein. The output data of the EFM demodulator 61 is supplied to both a subcode demodulator 62 and a controller 63. The sub-code demodulator 62 separates the data into word components of 32 symbols including parity symbols P and Q and subcode data components. The controller 63 is connected to a RAM (random-access memory) 64. The RAM 64 is supplied with a clock signal CK1 for wiring data and a clock signal CK2 for reading data. These clock signals CK1 and CK2 are both generated by frequency division from the foregoing PLL clock signal (PLCK). The controller 63 writes the data output from the EFM demodulator 61 to the RAM in response to the clock signal CK1 and reads the data written to the RAM 64 in response to the clock signal CK2. Consequently, a jitter due to the motor, contained in the data output from the EFM demodulator 61, is absorbed.

The data read out from the RAM 64 is supplied to an error correction unit 65. In response to the PLCK, the error correction unit 65 executes a C1-sequence error correction processing for data components of 32 symbols per frame, based on a parity symbol P, and then executes a de-interleave processing for data of 24 symbols and a parity symbol Q of 4 symbols. After that, a CIRC (cross interleave reed-solomon code) is decoded by executing a C2-sequence error correction processing based on the parity symbol Q. For example, an average of uncorrectable data is revised on the basis of the result of the error correction processing, and the revised average is output as 16-bit digital data. In a CD reproduction apparatus, the 16-bit digital data is supplied to the D/A converter (not shown) and converted into an analog signal therein. The output signal of the D/A converter is supplied to a low-pass filter (not shown), and an audio signal is output from the low-pass filter.

Figure 3:
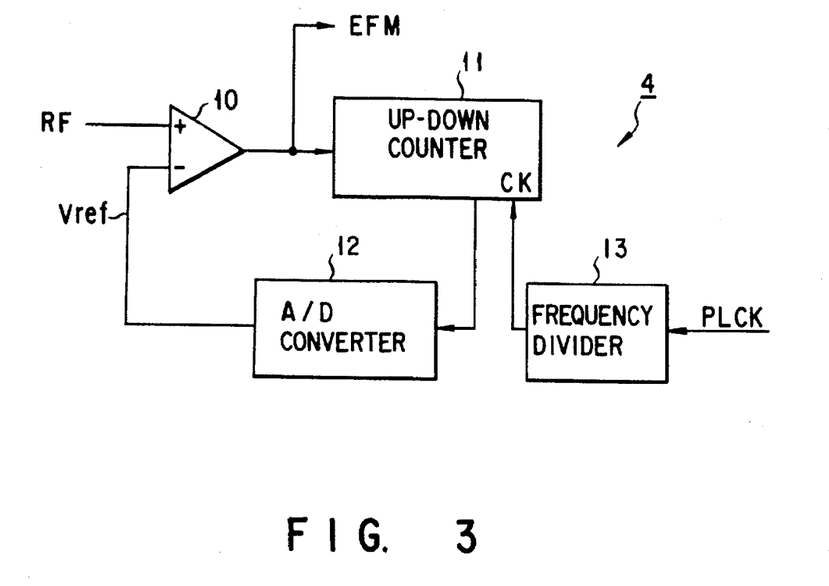
FIG. 3 is a block diagram showing an example of a data slice circuit of the disk reproduction apparatus of FIG. 1.

FIG. 3 illustrates an example of the data slice circuit 4 described above. In this circuit 4, the RF signal output from the amplifier 3 is supplied to a non-inverting input terminal of a comparator 10, and a reference voltage Vref is supplied to an inverting input terminal thereof. The comparator 10 compares the RF signal and reference voltage Vref and converts the RF signal into binary data of "0" or "1". The output terminal of the comparator 10 is connected to an up-down counter 11. The up-down counter 11 is supplied with a clock signal CK to be counted. The up-down counter 11 counts the clock signal CK in accordance with a time period of data "0" output from the comparator 10 and that of data "1" output therefrom, and outputs differential data indicative of a difference between the time periods. In other words, the up-down counter 11 counts down the clock signal CK when data "0" is supplied from the comparator 10, and counts it up when data "1" is supplied therefrom. Therefore, the up-down counter 11 outputs the differential data. The differential data is supplied to a D/A converter 12, and converted into an analog voltage therein. The analog voltage is fed back to the comparator 10 as the reference voltage Vref mentioned above. This feedback causes the time periods of data "0" and data "1" output from the comparator 10 to be equalized to each other. The data "0" and "1" constitute an EFM signal.

The clock signal CK supplied to the up-down counter 11 has a frequency which optimizes the control frequency band of the reference voltage Vref, and its frequency is 1/N times as high as that of the PLCK, the frequency of the CK being obtained by dividing the frequency of the PLCK by a frequency divider 13. The frequency of the clock signal CK varies in proportion to the reproduction speed if the PLL circuit 5 is locked by the EFM signal. The control frequency band of the reference voltage Vref of the data slice circuit 4 is therefore controlled in response to the reproduction speed.

More specifically, if the reproduction speed increases, the PLL circuit 5 follows the speed, and the frequency of the PLCK increases. Since the frequency of the clock signal CK of the up-down counter 11 increases accordingly, the counting results vary rapidly and the transmission gain of the up-down counter 11 increases. Consequently, in a feedback loop, the open loop gain increases and the control frequency band broadens. If the reproduction speed decreases to the contrary, the frequency of the PLCK lowers and the control frequency band narrows.

According to the above embodiment of the present invention, in the data processing circuit 6, the controller 63 writes the output data of the EFM demodulator 61 to the RAM 64 in response to the clock signal CK1 generated from the PLCK and reads the output data from the RAM 64 in response to the clock signal CK2 generated from the PLCK. The error correction unit 65 executes an error correction processing in response to the PLL clock signal (PLCK). Therefore, data can be output immediately even when the reproduction speed is changed.

Figure 4A:
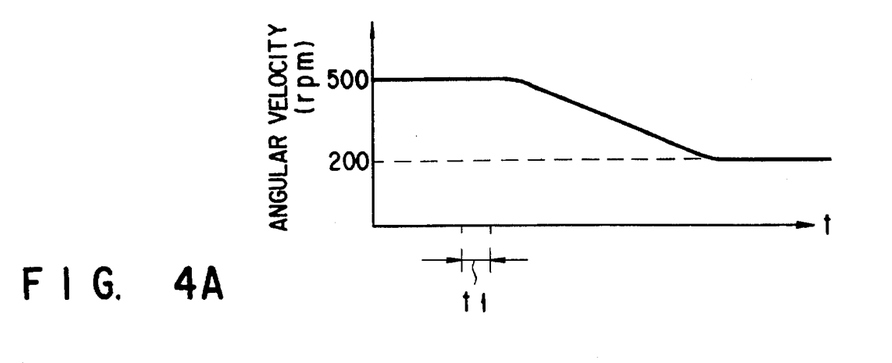
FIG. 4A is a graph showing an angular velocity of the disk reproduction apparatus of FIG. 1.
Figure 4B:
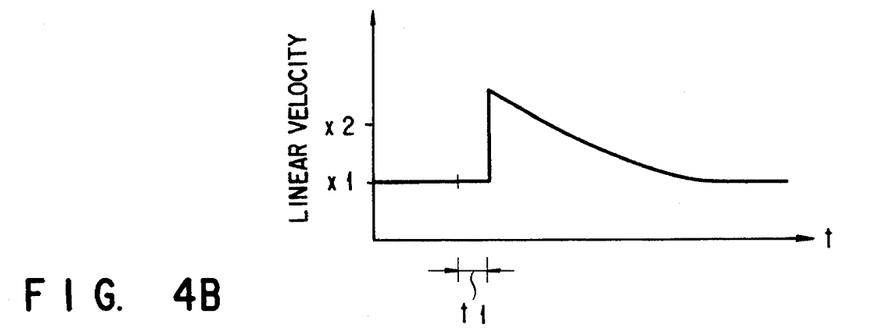
FIG. 4B is a graph showing a linear velocity of the disk reproduction apparatus of FIG. 1.

Assume, as shown in FIG. 4A, that the pickup 2 moves from the inner circumference of a disk to the outer circumference thereof during a period of time t1 when the outer circumference of the disk rotating at an angular velocity of 200 rpm is accessed after the inner circumference of the disk rotating at an angular velocity of 500 rpm. In this case, as shown in FIG. 4B, the linear velocity becomes 2.5 (=500/200) times as high as before a lapse of time t1.

Figure 4C:
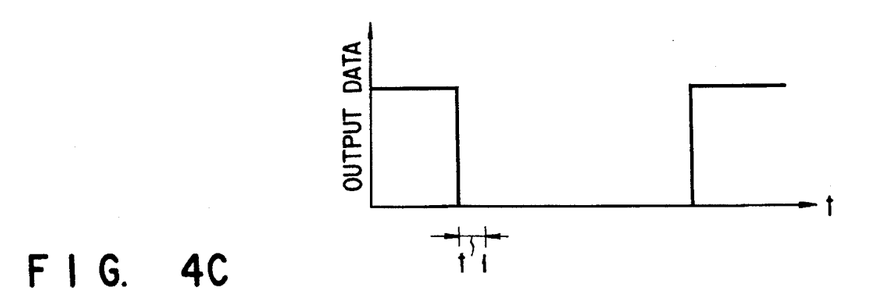
FIG. 4C is a graph showing an operation of a conventional disk reproduction apparatus.

In the conventional disk reproduction apparatus, a PLL clock signal (PLCK) is used in the data processing circuit when data is written to the RAM, and a quartz reference clock signal (XCLK) is used therein when data is read out from the RAM. Moreover, the XCLK is employed in the error correction unit. For this reason, as shown in FIG. 4C, data cannot be stably reproduced before the linear velocity becomes an equal speed, and therefore the reproduction of data is intermitted.

Figure 4D:
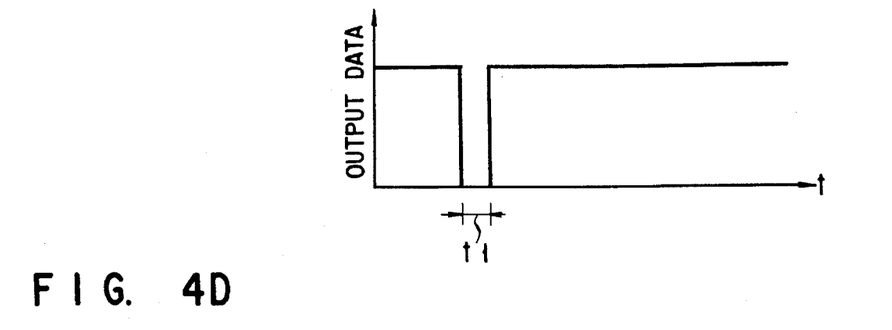
FIG. 4D is a graph showing an operation of the disk reproduction apparatus of FIG. 1.

In contrast, according to the above embodiment of the present invention, since the PLCK is synchronized with the reproduction speed, data can be reproduced stable after a lapse of time t1. Therefore, as shown in FIG. 4D, data can be reproduced reliably, and a time period from the disk is accessed until data is output again, can be shortened accordingly.

Furthermore, since the data slice circuit 4 controls the control frequency band of the reference voltage Vref in response to the PLCK, the optimum control frequency band can be secured in accordance with the reproduction speed, and thus the same performance can be maintained for every reproduction speed.

Figure 5:
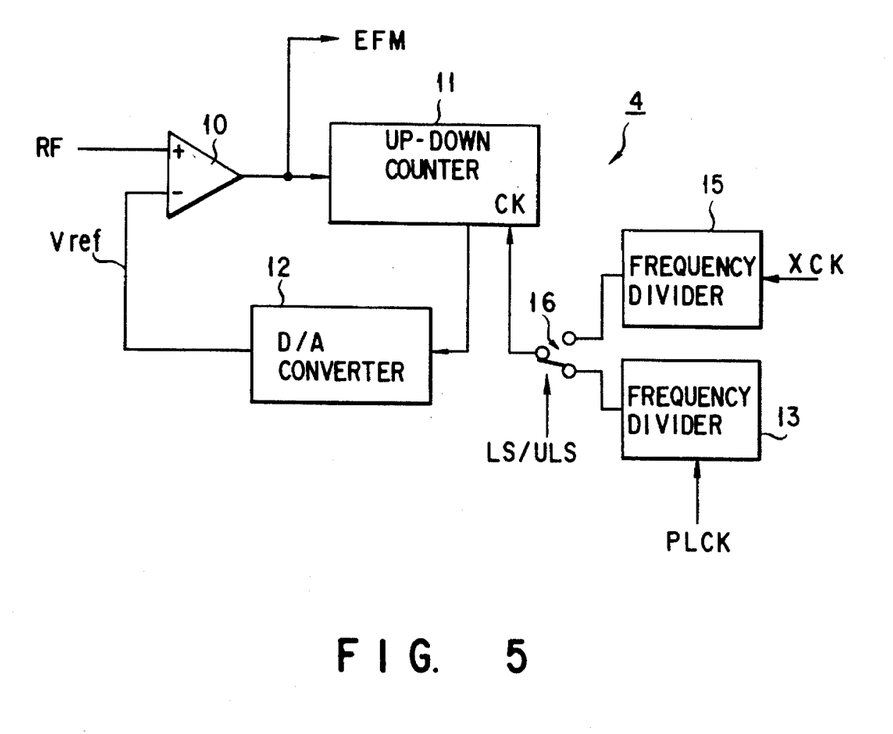
FIG. 5 is a block diagram showing another example of the data slice circuit of the disk reproduction apparatus of FIG. 1.

FIG. 5 shows another example of the data slice circuit 4. In FIG. 5, the same components as those of FIG. 3 are denoted by the same reference numerals, and their descriptions are omitted.

In the data slice circuit shown in FIG. 3, the output signal of the frequency divider 13 is defined as the clock signal CK of the up-down counter 11. The data slice circuit shown in FIG. 5 includes a frequency divider 15 and a switch 16 in addition to the frequency divider 13. As described above, the frequency divider 13 generates a PLL type clock signal CK, by dividing the PLCK into 1/N. The frequency divider 15 generates a quartz type clock signal CK having a fixed frequency, by dividing the system reference clock signal XCK into 1/M. The switch 6 selects one of the clock signal CK output from the frequency divider 13 and the clock signal CK output from the frequency divider 15, in response to, for example, a lock/unlock signal (LS/ULS) output from the data processing circuit 6, and supplies the selected one to the up-down counter 11.

More specifically, a 24-bit frame synchronization signal is detected every 7.35 KHz in the data processing circuit 6 when the PLL circuit 5 is locked, and a detection cycle thereof varies when it is not locked. When the PLL circuit 5 is locked, the switch 16 selects a PLL type clock signal CK output from the frequency divider 13. When it is not locked, the switch 16 selects a quartz type clock signal CK output from the frequency divider 15. The frequency of the quartz type clock signal CK is set so as to optimize the control frequency band when the reproduction speed is at the middle of a range of variations thereof. If, therefore, the lock of the PLL circuit 5 is delayed by some factors, the control frequency band of the data slice circuit 4 can be prevented from being greatly shifted from the optimum value. The switching of the switch 16 is not limited to the case where the PLL circuit 5 is completely locked or unlocked, but can be executed in a range slightly shifted from the locked or unlocked state of the PLL circuit 5. The switching conditions of the switch 16 are as follows:

(1) The switch selects a PLL type clock signal CK when the PLL circuit is locked, and selects a quartz type clock signal CK when it is unlocked.

(2) The switch selects a PLL type clock signal CK if the frequency of the clock signal output from the PLL circuit falls within a range between—d % and+d % of the frequency of the EFM signal, and selects a quartz type clock signal CK if it does not fall within the range. The frequency range d % is determined in advance.

What is claimed is:
1. A disk reproduction apparatus comprising:
photoelectric transducer means for optically reading data recorded on a disk and converting the data into an electrical signal;
an amplifier for amplifying the electrical signal supplied from said photoelectric transducer means;
a data slice circuit for binarizing an electrical signal supplied from said amplifier to generate an EFM (eight to fourteen modulation) signal;
a PLL circuit for generating a clock signal corresponding to a variation in reproduction speed of data, in response to the EFM signal supplied from said data slice circuit; and
a data processing circuit for demodulating the EFM signal supplied from said data slice circuit in response to the clock signal supplied from said PLL circuit, and reproducing data,
said data slice circuit including:
a comparator for comparing the electrical signal supplied from said amplifier with a reference voltage, said comparator outputting one of data "0" and data "1" in accordance with the electrical signal and the reference voltage;
a frequency divider for dividing a frequency of the clock signal supplied from said PLL circuit to generate a count clock signal;
an up-down counter for counting the count clock signal supplied from said frequency divider in accordance with a time period of the data "0" and a time period of the data "1" supplied from said comparator, said up-down counter outputting differential data representing a difference between the time period of the data "0" and the time period of the data "1"; and
a digital-to-analog converter supplied with the differential data from said up-down counter, said digital-to-analog converter converting the differential data into an analog voltage and supplying the analog voltage to said comparator as the reference voltage.

2. A disk reproduction apparatus according to claim 1, wherein said data processing circuit comprises:
a first demodulator for demodulating the EFM signal supplied from said data slice circuit;
a memory for storing data output from said first demodulator;
a controller for writing the data output from said first demodulator to the memory in response to the clock signal supplied from said PLL circuit, and reading out the data written to the memory in response to the clock signal; and
an error correction circuit for correcting an error of the data read out from said controller, in response to the clock signal supplied from said PLL circuit.

3. A disk reproduction apparatus according to claim 2, further comprising a second demodulator for demodulating the data output from said first demodulator into subcode data.

4. A disk reproduction apparatus comprising:
photoelectric transducer means for optically reading data recorded on a disk and converting the data into an electrical signal;
a data slice circuit for binarizing the electrical signal supplied from said photoelectric transducer to generate an EFM signal;
a PLL circuit for generating a clock signal corresponding to a variation in reproduction speed of data, in response to the EFM signal supplied from said data slice circuit; and
a data processing circuit for demodulating the EFM signal supplied from said data slice circuit in response to the clock signal supplied from said PLL circuit, and reproducing data,
said data slice circuit including:
a first clock signal generator for generating a clock signal in response to the clock signal supplied from said PLL circuit;
a second clock signal generator for generating a clock signal in response to a reference clock signal generated by a quartz oscillator;

a switch connected to said first and second clock signal generators, for selecting one of the clock signals output from said first and second clock signal generators;

a comparator for comparing the electrical signal supplied from said photoelectric transducer with a reference voltage, said comparator outputting one of data "0" and data "1" in accordance with the electrical signal and the reference voltage;

an up-down counter for counting the clock signal selected by said switch in accordance with a time period of the data "0" and a time period of the data "1" supplied from said comparator, said up-down counter outputting differential data representing a difference between the time period of the data "0" and the time period of the data "1"; and a digital-to-analog converter supplied with the differential data from said up-down counter, said digital-to-analog converter converting the differential data into an analog voltage and supplying the analog voltage to said comparator as the reference voltage.

5. A disk reproduction apparatus according to claim 4, wherein said data processing circuit comprises:

a first demodulator for demodulating the EFM signal supplied from said data slice circuit;

a memory for storing data output from said first demodulator;

a controller for writing the data output from said first demodulator to the memory in response to the clock signal supplied from said PLL circuit, and reading out the data written to the memory in response to the clock signal; and an error correction circuit for correcting an error of the data read out from said controller, in response to the clock signal supplied from said PLL circuit.

6. A disk reproduction apparatus according to claim 5, further comprising a second demodulator for demodulating the data output from said first demodulator into subcode data.

7. A disk reproduction apparatus according to claim 4, wherein said first clock signal generator includes a first frequency divider for dividing a frequency of the clock signal supplied from said PLL circuit and said second clock signal generator includes a second frequency divider for dividing a frequency of the reference clock signal generated by the quartz crystal.

8. A disk reproduction apparatus comprising:

photoelectric transducer means for optically reading data recorded on a disk and converting the data into an electrical signal;

a data slice circuit for binarizing the electrical signal supplied from said photoelectric transducer to generate an EFM signal;

a PLL circuit for generating a clock signal corresponding to a variation in reproduction speed of data, in response to the EFM signal supplied from said data slice circuit; and a data processing circuit for demodulating the EFM signal supplied from said data slice circuit in response to the clock signal supplied from said PLL circuit, and reproducing data, said data slice circuit including:

a comparator for comparing the electrical signal supplied from said photoelectric transducer with a reference voltage, said comparator outputting one of data "0" and data "1" in accordance with the electrical signal and the reference voltage;

a detecting means for detecting differential data representing a difference between the time period of the data "0" and the time period of the data "1" based on the clock signal supplied from said PLL circuit; and a voltage generating means supplied with the differential data from said detecting means, said voltage generating means for generating a voltage in response to the differential data and supplying the voltage to said comparator as the reference voltage.

9. A disk reproduction apparatus according to claim 8, wherein said data processing circuit comprises:

a first demodulator for demodulating the EFM signal supplied from said data slice circuit;

a memory for storing data output from said first demodulator;

a controller for writing the data output from said first demodulator to the memory in response to the clock signal supplied from said PLL circuit, and reading out the data written to the memory in response to the clock signal; and an error correction circuit for correcting an error of the data read out from said controller, in response to the clock signal supplied from said PLL circuit.

10. A disk reproduction apparatus according to claim 9, further comprising a second demodulator for demodulating the data output from said first demodulator into subcode data.

11. A disk reproduction apparatus comprising:

read means for reading data recorded on a disk as an electrical signal;

a data slice circuit for binarizing the electrical signal supplied from said read means to generate an EFM signal;

a PLL circuit for generating a clock signal corresponding to a variation in reproduction speed of data, in response to the EFM signal supplied from said data slice circuit; and a data processing circuit for demodulating the EFM signal supplied from said data slice circuit in response to the clock signal supplied from said PLL circuit, and reproducing data, said data slice circuit including:

a comparator for comparing the electrical signal read from the disk with a reference voltage, said comparator outputting one of data "0" and data "1" in accordance with the electrical signal and the reference voltage;

an up-down counter for counting the clock signal supplied from said PLL circuit in accordance with a time period of the data "0" and a time period of the data "1" supplied from said comparator, said up-down counter outputting differential data representing a difference between the time period of the data "0" and the time period of the data "1"; and a digital-to-analog converter supplied with the differential data from said up-down counter, said digital-to-analog converter converting the differential data into an analog voltage and supplying the analog voltage to said comparator as the reference voltage.

12. A disk reproduction apparatus according to claim 11, wherein said data processing circuit comprises:

a first demodulator for demodulating the EFM signal supplied from said data slice circuit;

a memory for storing data output from said first demodulator;

a controller for writing the data output from said first demodulator to the memory in response to the clock signal supplied from said PLL circuit, and reading out the data written to the memory in response to the clock signal; and an error correction circuit for correcting an error of the data read out from said controller, in response to the clock signal supplied from said PLL circuit.

13. A disk reproduction apparatus according to claim 12, further comprising a second demodulator for demodulating the data output from said first demodulator into subcode data.

14. A disk reproduction apparatus comprising:

read means for reading data recorded on a disk as an electrical signal;

a data slice circuit for binarizing the electrical signal supplied from said read means to generate an EFM signal;

a PLL circuit for generating a clock signal corresponding to a variation in reproduction speed of data, in response to the EFM signal supplied from said data slice circuit; and a data processing circuit for demodulating the EFM signal supplied from said data slice circuit in response to the clock signal supplied from said PLL circuit, and reproducing data, said data processing circuit including:
a first demodulator for demodulating the EFM signal supplied from said data slice circuit;
a memory for storing data output from said first demodulator;
a controller for writing the data output from said first demodulator to the memory in response to the clock signal supplied from said PLL circuit, and reading out the data written to the memory in response to the clock signal; and
an error correction circuit for correcting an error of the data read out from said controller, in response to the clock signal supplied from said PLL circuit, and said data slice circuit including:
a comparator for comparing the electrical signal read from the disk with a reference voltage, said comparator outputting one of data "0" and data "1" in accordance with the electrical signal and the reference voltage;
an up-down counter for counting the clock signal supplied from said PLL circuit in accordance with a time period of the data "0" and a time period of the data "1" supplied from said comparator, said up-down counter outputting differential data representing a difference between the time period of the data "0" and the time period of the data "1"; and
a digital-to-analog converter supplied with the differential data from said up-down counter, said digital-to-analog converter converting the differential data into an analog voltage and supplying the analog voltage to said comparator as the reference voltage.

15. A signal processing circuit for use in disk data reproduction, the disk data being read from a disk and being converted into an amplified electrical signal, the signal processing circuit comprising:

a data slice circuit for binarizing the amplified electrical signal to generate a modulated signal; and a PLL circuit for generating a PLL clock signal corresponding to a variation in reproduction speed of data, in response to the modulated signal supplied from said data slice circuit, wherein said data slice circuit includes:
a comparator for comparing the amplified electrical signal with a reference voltage, said comparator outputting one of data "0" and data "1" in accordance with the amplified electrical signal and the reference voltage;
a frequency divider for dividing a frequency of the PLL clock signal supplied from said PLL circuit to generate a count clock signal;
an up-down counter for counting the count clock signal supplied from said frequency divider in accordance with a first time period of the data "0" and a second time period of the data "1" supplied from said comparator, said up-down counter outputting differential data representing a difference between the first time period of the data "0" and the second time period of the data "1"; and
a digital-to-analog converter supplied with the differential data from said up-down counter, said digital-to-analog converter converting the differential data into an analog voltage and supplying the analog voltage to said comparator as the reference voltage, whereby the data slice circuit binarizes the amplified electrical signal in accordance with the variation in reproduction speed of data.

16. The signal processing circuit according to claim 15, further comprising a data processing circuit for demodulating said modulated signal supplied from said data slice circuit in response to the PLL clock signal supplied from said PLL circuit, and for reproducing data.

17. The signal processing circuit according to claim 16, wherein said data processing circuit comprises:

a first demodulator for demodulating signal supplied from said data slice circuit;

a memory for storing data output from said first demodulator;

a controller for writing the data output from said first demodulator to the memory in response to the PLL clock signal supplied from said PLL circuit, and for reading out the data written to the memory in response to the PLL clock signal; and an error correction circuit for correcting an error of the data read out from said controller, in response to the PLL clock signal supplied from said PLL circuit.

18. The signal processing circuit according to claim 17, further comprising a second demodulator for demodulating the data output from said first demodulator into subcode data.

19. A signal processing circuit for use in disk data reproduction, the disk data being read from a disk and being converted into an amplified electrical signal, the signal processing circuit comprising:

a data slice circuit for binarizing the amplified electrical signal to generate a modulated signal; and a PLL circuit for generating a PLL clock signal corresponding to a variation in reproduction speed of data, in response to the modulated signal supplied from said data slice circuit, wherein said data slice circuit includes:
a comparator for comparing the amplified electrical signal with a reference voltage, said comparator outputting one of data "0" and data "1" in accordance with the amplified electrical signal and the reference voltage;
a first frequency divider for dividing a frequency of the PLL clock signal supplied from said PLL circuit and for generating a first clock signal;

a second frequency divider for dividing a frequency of a reference clock signal supplied from a quartz oscillator and for outputting a second clock signal;

a switch connected to said first and second frequency dividers, for selecting one of the first and second clock signals and for outputting a count clock signal;

an up-down counter for counting the count clock signal supplied from said switch in accordance with a first time period of the data "0" and a second time period of the data "1" supplied from said comparator, said up-down counter outputting differential data representing a difference between the first time period of the data "0" and the second time period of the data "1"; and a digital-to-analog converter supplied with the differential data from said up-down counter, said digital-to-analog converter converting the differential data into an analog voltage and supplying the analog voltage to said comparator as the reference voltage, whereby the data slice circuit binarizes the amplified electrical signal in accordance with the variation in reproduction speed of data.

20. The signal processing circuit according to claim 19, wherein said switch is controlled by a control signal representing whether said PLL circuit is locked or not.

21. The signal processing circuit according to claim 20, wherein said switch selects the first clock signal when said control signal represents a lock state of said PLL circuit, and said switch selects the second clock signal when said control signal represents an unlock state of said PLL circuit.

22. The signal processing circuit according to claim 20, wherein said switch selects the first clock signal output from said PLL circuit when a frequency of the PLL clock signal falls within a predetermined frequency range of said modulated signal, and said switch selects the second clock signal when the frequency of the PLL clock signal falls outside the predetermined frequency range of said modulated signal.

23. The signal processing circuit according to claim 19, further comprising a data processing circuit for demodulating said modulated signal supplied from said data slice circuit in response to the PLL clock signal supplied from said PLL circuit, and for reproducing data.

24. The signal processing circuit according to claim 23, wherein said data processing circuit comprises:

a first demodulator for demodulating the modulated signal supplied from said data slice circuit;

a memory for storing data output from said first demodulator;

a controller for writing the data output from said first demodulator to the memory in response to the PLL clock signal supplied from said PLL circuit, and for reading out the data written to the memory in response to the PLL clock signal; and an error correction circuit for correcting an error of the data read out from said controller, in response to the PLL clock signal supplied from said PLL circuit.

25. The signal processing circuit according to claim 24, further comprising a second demodulator for demodulating the data output from said first demodulator into subcode data.

* * * * *